United States Patent [19]

Gay et al.

[11] 4,128,029

[45] Dec. 5, 1978

[54] SUPPORT TABLE FOR CIRCULAR SAW

[75] Inventors: Danny Gay, Richmond; James Horine; James C. Hudson, both of Lexington; Joseph P. Sallee; Hershel R. Wininger, both of Richmond, all of Ky.

[73] Assignee: Irvin Industries, Inc., Stamford, Conn.

[21] Appl. No.: 859,963

[22] Filed: Dec. 12, 1977

[51] Int. Cl.² .................. B27B 5/22; B27B 25/10; B27B 27/06

[52] U.S. Cl. .......................... 83/437; 83/425; 83/438; 83/477.2; 83/478

[58] Field of Search .............. 83/431, 435.1, 438, 83/472, 477.2, 418, 648, 437, 467, 468, 473–477.1, 478, 425

[56] References Cited

U.S. PATENT DOCUMENTS 2,261,696  11/1941  Ocenasek ........................ 83/473
3,968,712  7/1976  Duncan ........................ 83/477.2

*Primary Examiner*—J. M. Meister
*Attorney, Agent, or Firm*—McAulay, Fields, Fisher & Goldstein

[57] ABSTRACT

A table for a saw has three equal table segments supported on foldable legs. The three segments are spaced from one another by spacer elements and held in position by front and back longitudinal rails and nut and bolt combinations through the spacer elements. The spacer elements hold the table segments spaced from one another thereby defining first and second lateral slots within which the rail of a mitre gauge can ride. Four spacer elements are integral parts of a spacer bar. Each spacer bar has laterally spaced spacer elements and vertically spaced spacer elements thereby providing numerous accurately dimensioned spacing locations between adjacent table segments. The spacer elements and longitudinal rails in combination establish table element positioning and rigidity with respect to one another as well as established two longitudinal slots having a uniform predetermined width.

7 Claims, 6 Drawing Figures

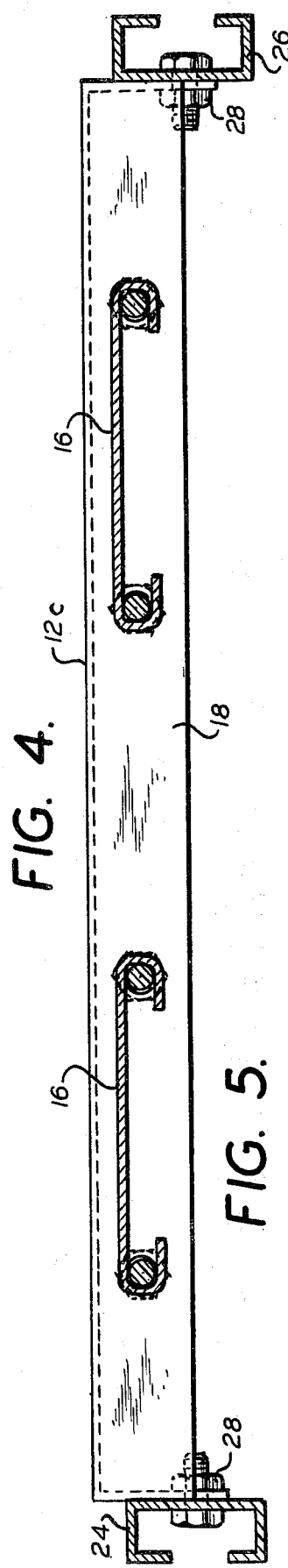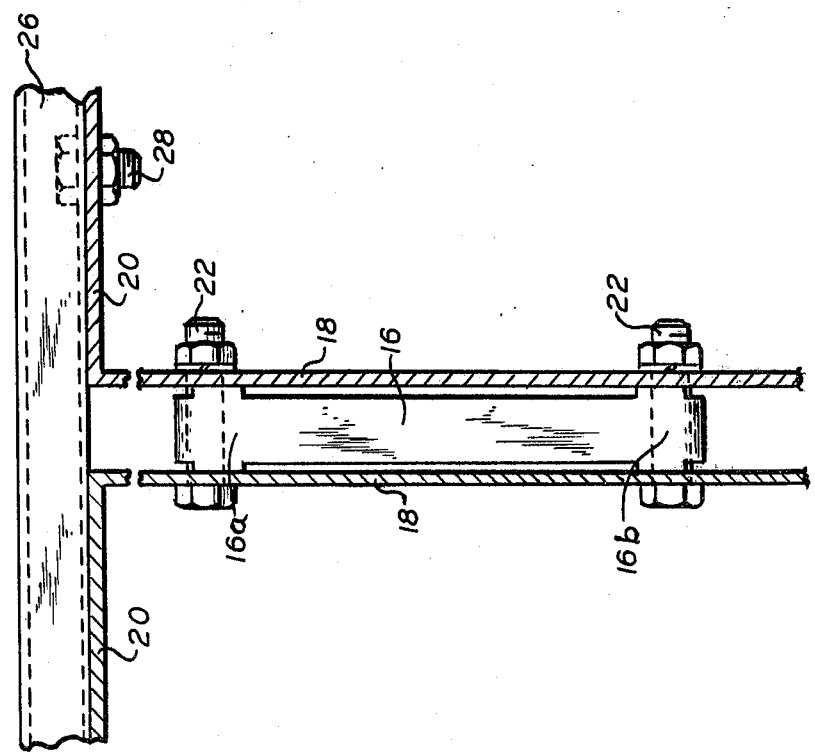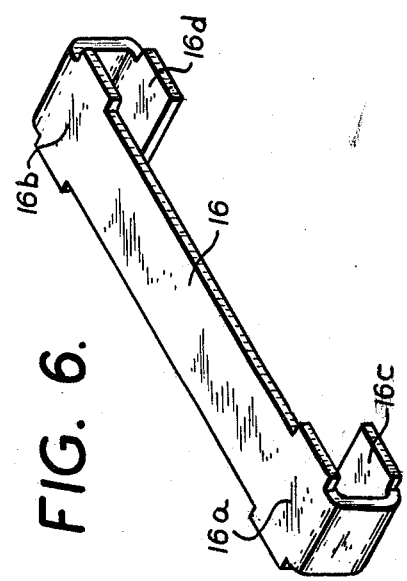

SUPPORT TABLE FOR CIRCULAR SAW

BACKGROUND OF THE INVENTION

This invention relates in general to a support table for a circular saw and more particularly to those tables which are adapted to be used by the home hobbiest or craftsman.

Such tables are well known in this art and are widely used. The extend to which they are available to the individual home hobbiest or individual craftsman is in large part a function of their cost and utility. The utility of these types of tables is a function of parameters such as how sturdy the table is, how versatile it is and how safe it is in use.

Heretofore, such support tables have been designed for ease of transportation and portability, but they have been less than portable. These support tables with the saw attached to form a composite unit are bulky and somewhat awkward to package.

Presently available table saws are sometimes used with an adjustable rip fence and a mitre gauge. The presently available table saws are also made with a large center table segment and two smaller side extensions or table segments. Once these table saws are set up for use by the home hobbiest or individual craftsman, they are usually not dismantled or moved. The two smaller side extensions are cantilevered to the center table segment.

It is a major purpose of this invention to provide a support table which may be available to a large number of potential users. More particularly, it is a purpose of this invention to provide such a table which is sturdy, versatile and safe while at the same time being relatively simple to fabricate, simple to assemble and thus less costly than other support table structures.

In known support tables, the center segment has a transverse opening through which the saw blade projects above the table surface. Two transverse grooves are usually provided, one on each side of the transverse opening. These transverse grooves provide a guide track for the mitre gauge. These grooves accumulate saw dust and require frequent cleaning.

A transverse rip fence is usually provided. It is supported and guided by an attachment to the support table. The rip fence is conventionally used on the right hand side of the saw table but can be placed on either side of the saw blade.

It is important that the saw table make provision for the use of a rip fence and a mitre gauge. It is important that the position of these two accessories adjust easily yet that they be accurately held in position during use. Accordingly, it is another purpose of this invention to provide simple but accurate supports and guides for these two accessories.

A further purpose of the invention is the provision of a support table structure which is easily portable and which can accommodate a separate circular saw, particularly a portable circular hand saw.

Another purpose of this invention is to provide for a less costly support table structure through the use of a relatively smaller number of different parts.

BRIEF DESCRIPTION

The present invention accomplishes the foregoing purposes by providing a table for the support and positioning of a circular saw. Specifically, the support table structure includes a table top having a work supporting surface and four legs.

The table top comprises three substantially identical table segments. The center segment has a lateral opening to accommodate the saw blade. The center segment includes clamping devices to hold the circular saw housing fixed to the underside of the table with the saw blade projecting through the lateral opening to extend above the top surface of the center segment. The clamping devices are easily loosened to remove the circular saw when transporting or storing the support table, or when using the circular saw as a conventional hand tool.

The three table segments, though connected together, are spaced from one another to provide two lateral slots to receive and guide the slide of the mitre gauge. In each slot are two spacer elements located below the top surface of the adjacent table segments to provide an uninterrupted track for the slide of the mitre gauge. There are two lateral slots, one on either side of the saw blade opening, to provide for left side and right side use of the mitre gauge.

The spacer element has a predetermined width, and this assures that there is a predetermined spacing between each two adjacent table segments. The spacer elements control the width and uniformity of the lateral slots.

A pair of longitudinal rails, one each across the front and back edges of the table segments, provide front and rear rigid support to assure rigidity of the table segments relative to each other. The front longitudinal rail also provides a track for a rip fence.

BRIEF DESCRIPTION OF THE DRAWINGS

FIG. 4 is a view along the plan 4—4 of FIG. 2 showing the relationship between the spacer bars and one of the lateral edge flanges of one of the table segments.

FIG. 5 is a view along the plane 5—5 of FIG. 4 showing the connection between two adjacent table segments.

FIG. 6 is an isometric view of one of the spacer bars.

DESCRIPTION OF THE PREFERRED EMBODIMENTS

Figure 1:
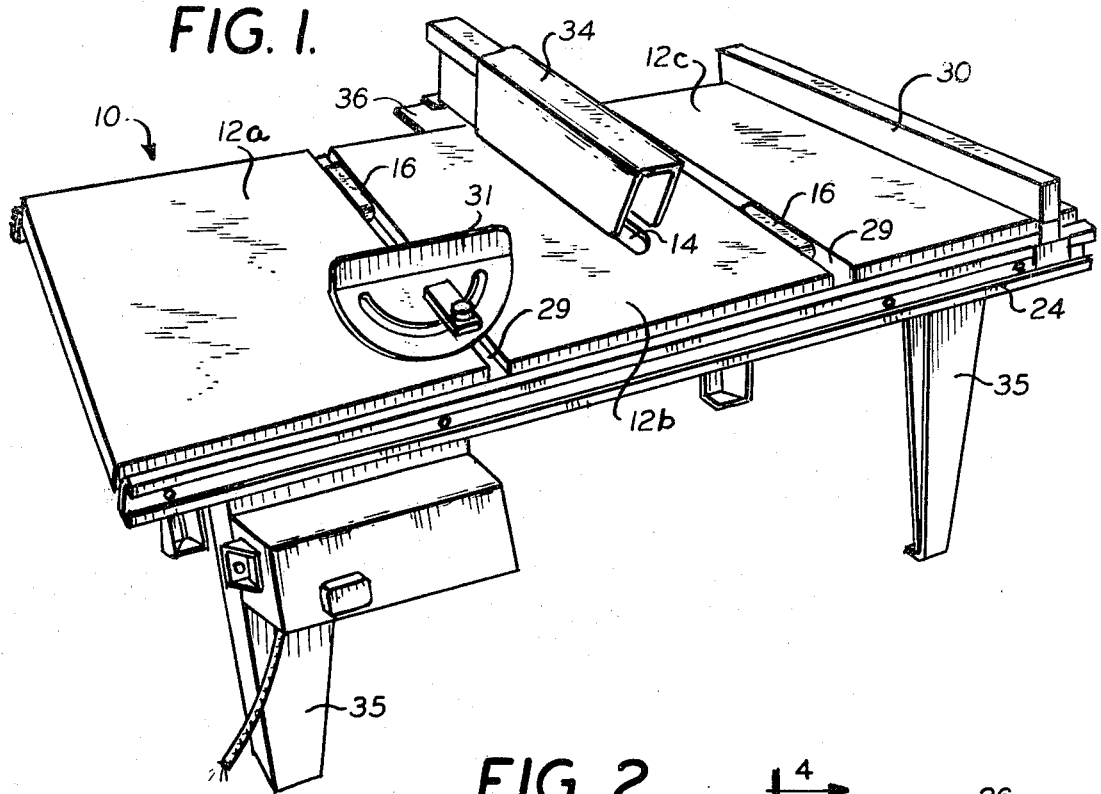
FIG. 1 is an isometric view of an embodiment of the table of this invention.
Figure 2:
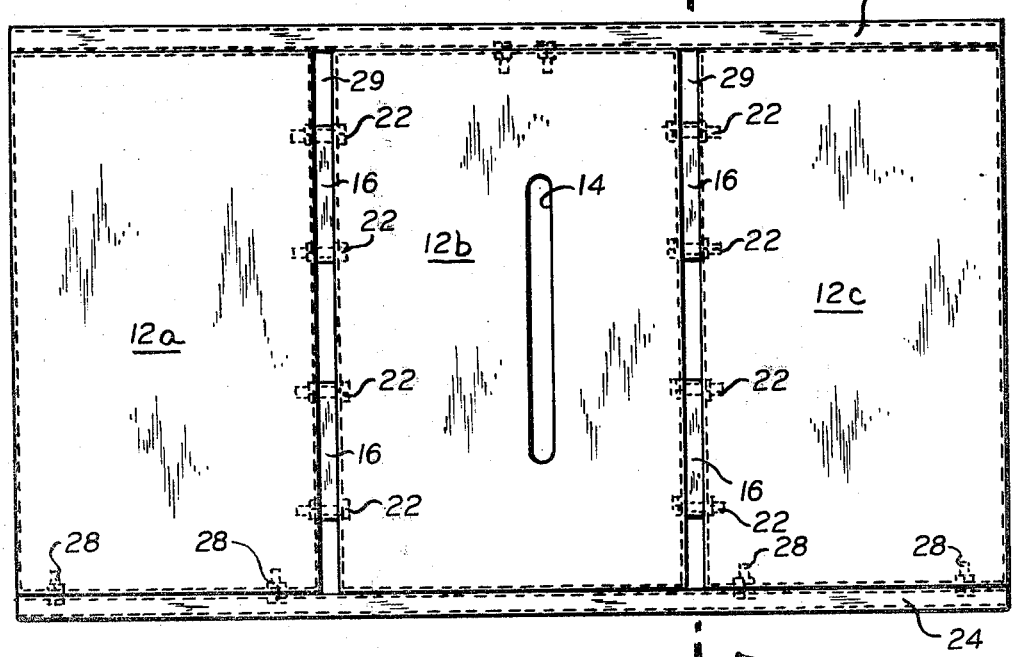
FIG. 2 is a plan view of the FIG. 1 table with the saw, mitre gauge and rip fence removed.
Figure 3:
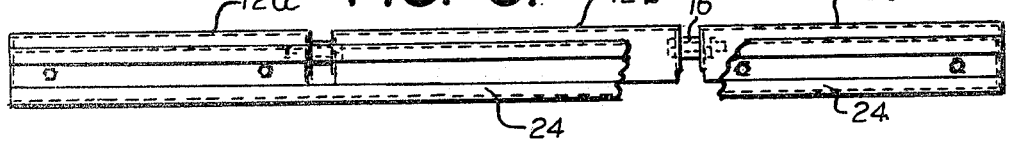
FIG. 3 is a elevation view along the front edge of the FIG. 1 table with a portion of the front rail broken away to show a spacer bar in one of the two longitudinal slots.

All the figures of the drawings represent the same embodiment, and thus the same reference characters designate corresponding parts throughout the several views. A table 10 for positioning and supporting a removable circular saw is formed from three similar table segments 12a, 12b and 12c. The two end segments 12a and 12c can be designed to be interchangeable. The center segment 12b is adapted to support the saw. This center segment 12b is similar to table segments 12a and 12c. However, table segment 12b further includes a lateral slot 14 through which the blade of the saw passes.

In manufacture, all three table segments may be manufactured at a first stage so that they are identical. After the first stage of manufacture, one third of the table segments are further processed to have the lateral slot 14 made to receive the blade of a conventional hand-held circular saw. The underside of the center segment 12b is provided with clamps to hold the face plate or base of the circular saw. The other table segments 12a, 12c are used as the side extensions to form the composite table unit.

To facilitate assembling the three table segments, two spacer elements 16 are provided between each pair of table segments. Each spacer element 16 is carried by a pair of nut-bolt combinations 22. The nut-bolt combinations 22 connect adjacent table segments. Each table segment is provided with lateral flanges 18 and longitudinal flanges 20. When the table is assembled, the flanges 18 are parallel to lateral slot 14 and the flanges 20 are perpendicular to slot 14.

Table 10 includes a front rail 24 and a rear rail 26, which are connected to flanges 20 by nut-bolt combinations 28. The top surface of the table segments 12a, 12b, 12c is above the top surface of rails 24 and 26.

The spacers 16, together with the rails 24 and 26, assure that the width of the slots 29 between adjacent tables are predetermined and uniform. This arrangement also assures that the inboard edges of the segments 12a and 12c are parallel to the slot 14 to assure a proper relation between mitre gauge and saw blade. The lateral slots 29 provide the guide for the slide of a mitre gauge 31.

Thus, no special mitre gauge slots or tracks are necessary or required to be cut into the top surface of the table 10. The openings in rails 24 and 26 and in the flanges 20 to receive the nut-bolt combinations 28 do not require close tolerances because the spacer elements 16 determine the dimension and uniformity of the mitre gauge slots.

The spacer elements 16 make it feasible to use the longitudinal rails 24, 26 by assisting in the longitudinal alignment of the three table segments. The spacer elements 16 therefore serve a dual purpose. One is to assure uniform width of the guide tracks 29 for the mitre gauge. The other provides for the possiblity of using bolt holes in the longitudinal rail that are slightly oversize and thus do not have to be manufactured to exact tolerance.

Each spacer bar 16 is composed of four separate spacer elements 16a, 16b, 16c and 16d. These four spacer elements are spaced from each other so as to form laterally spaced pairs 16a, 16b and 16c, 16d as well as vertically spaced pairs 16a, 16c and 16b, 16d. In this fashion, the laterally spaced pairs prevent table segment racking about a vertical axis. Similarly, the vertically spaced pairs prevent table racking about a lateral horizontal axis. Racking of the table segments relative to each other about a longitudinal horizontal axis is prevented by the front and rear rails 24, 26. It is important that any of the three degrees of rotational movement be prevented to maintain the dimensional stability of the slots 29 so that they can be employed as the means to receive and guide the rail of the mitre gauge.

The use of four outwardly extending shoulders integral with the spacer bar 16 to form the four spacer elements 16a, 16b, 16c and 16d provides an important fabrication advantage. It is necessary to accurately machine only the outboard edges of the shoulders in order to establish the required predetermined width for the slots 29 and to assure that the slots 29 are uniform in width throughout their length. The use of two separate spacer elements 16 in each slot 29, thereby establishing four longitudinally spaced spacer elements aids in assuring the required uniform slot width.

Table 10 includes a rip fence assembly 30 which is provided with guides 32. Both the front and rear rails 24, 26 provide a longitudinal track extending transversely to lateral slot 14. The guides 32 ride along the tracks on rails 24 and 26 so that the rip fence assembly can be moved longitudinally. As the longitudinal rails 24, 26 are continuous members along the entire length of the three table segments, the rip fence 30 can be mounted on either side of the saw blade for right hand or left hand usage.

Another feature is the provision of foldable legs to provide for ease of storage and transportation. Each side segment 12a, 12c has two legs 35. A bracket connects each leg 35 to the underside of the table 10. A pivot connection between the legs 35 and the table top is provided. The legs are pivotable from their support position to a storage or transport position. In the storage position, the legs are substantially parallel to the underside of the table. In their support position, the legs can be locked in position perpendicular to the table. Alternatively, the legs can be completely removed from the table.

Table 10 also includes a blade guard 34 which is mounted on the table 10 by a mounting bracket 36. This guard 34 covers the rear and top of the saw blade. No front blade guard is necessary. The conventional circular saw has a blade guard which becomes a front blade guard, when the saw is clamped to the underside of the center table segment 12b.

What is claimed is:

1. A table to support and position a circular saw comprising:
   a table top having a work supporting surface and four legs supporting said table top,
   said table top comprising first, second and third longitudinally spaced segments,
   said first and said second table segments being spaced longitudinally a predetermined distance to provide a first lateral slot and said second and third table segments being spaced longitudinally a predetermined distance to provide a second lateral slot,
   said first and second lateral slots providing first and second tracks for the rail of a mitre gauge,
   a plurality of laterally spaced spacer elements and a plurality of vertically spaced spacer elements in each of said lateral slots, each of said spacer elements having a predetermined width and being positioned between said table segments and in contact with the facing edges of said segments to provide a predetermined uniform width for said first and second lateral slots, and
   front and back longitudinally disposed rails extending, respectively, across the front and back edges of said table segments and fastened to said table segments to provide front and rear rigid supports for said table segments.

2. The table of claim 1 wherein:
   at least a portion of said spacer elements in each of said slots are constituted as integral spacer elements of a laterally extending spacer bar, said spacer bar having integral first, second, third and fourth spacer elements,
   said first and second spacer elements being laterally spaced from one another, said second and fourth spacer elements being laterally spaced from one another, said first and third spacer elements being vertically spaced from one another and said second and fourth spacer elements being vertically spaced from one another.

3. The table of claim 2 having first and second of said spacer bars laterally spaced from one another in said first lateral slot and having third and fourth of said spacer bars laterally spaced from one another in said second lateral slot.

4. The table of claim 1 further comprising fastening means connected across said lateral slots to draw the facing edges of said table segments into abutting relation with said spacer elements.

5. The table of claim 2 further comprising fastening means connected across said lateral slots to draw the facing edges of said table segments into abutting relation with said spacer elements.

6. The table of claim 3 further comprising fastening means connected across said lateral slots to draw the facing edges of said table segments into abutting relation with said spacer elements.

7. The table of claim 1, wherein solely a rear and top blade guard assembly is connected with said center segment, the front guard assembly being provided by the circular saw.

* * * * *